US012686646B2

(12) United States Patent
Fuma et al.

(10) Patent No.: US 12,686,646 B2
(45) Date of Patent: Jul. 21, 2026

(54) DIELECTRIC DRYING METHOD AND DIELECTRIC DRYING APPARATUS FOR CERAMIC FORMED BODIES, AND METHOD FOR PRODUCING CERAMIC STRUCTURES

(71) Applicant: NGK Insulators, Ltd., Nagoya-City (JP)

(72) Inventors: Yoshimasa Fuma, Ichinomiya-City (JP); Yuichi Tajima, Nagoya-City (JP); Yoshimasa Kondo, Nagoya-City (JP); Kensuke Okumura, Chiryu-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 1111 days.

(21) Appl. No.: 17/659,039

(22) Filed: Apr. 13, 2022

(65) Prior Publication Data

US 2022/0234964 A1      Jul. 28, 2022

Related U.S. Application Data

(63) Continuation of application No. PCT/JP2020/006925, filed on Feb. 20, 2020.

(51) Int. Cl.
*C04B 41/00*          (2006.01)
*B28B 11/24*          (2006.01)
(Continued)

(52) U.S. Cl.
CPC ........ *C04B 41/0072* (2013.01); *B28B 11/243* (2013.01); *C04B 38/0006* (2013.01);
(Continued)

(58) Field of Classification Search
None
See application file for complete search history.

(56) References Cited

U.S. PATENT DOCUMENTS

| | | | |
|---|---|---|---|
| 4,439,929 A | 4/1984 | Kitagawa et al. | |
| 4,837,943 A | 6/1989 | Mizutani | |

(Continued)

FOREIGN PATENT DOCUMENTS

| | | |
|---|---|---|
| CN | 1452852 A | 10/2003 |
| CN | 102235803 A | 11/2011 |

(Continued)

OTHER PUBLICATIONS

Chinese Office Action (Application No. 202080069038.8) dated Nov. 11, 2022 (with English translation).

(Continued)

*Primary Examiner* — Jason Lau
(74) *Attorney, Agent, or Firm* — Muncy, Geissler, Olds & Lowe, P.C.

(57)          ABSTRACT

A dielectric drying method for ceramic formed bodies includes drying a plurality of ceramic formed bodies placed side by side in a direction perpendicular to a conveying direction on upper surfaces of drying tables by conveying the ceramic formed bodies between electrodes of an upper electrode and a lower electrode, and applying a high frequency between the electrodes. In the direction perpendicular to the conveying direction of the ceramic formed body, a distance between the electrodes in two end regions between which a central region is interposed is shorter than a distance between the electrodes in the central region.

17 Claims, 3 Drawing Sheets

(51) Int. Cl.

| | | |
|---|---|---|
| *C04B 38/00* | (2006.01) | |
| *C04B 41/80* | (2006.01) | |
| *F26B 3/34* | (2006.01) | |
| *F26B 15/12* | (2006.01) | |

(52) U.S. Cl.

CPC ............ *C04B 41/009* (2013.01); *C04B 41/80* (2013.01); *F26B 3/34* (2013.01); *F26B 15/12* (2013.01); *F26B 2210/02* (2013.01)

(56) References Cited

U.S. PATENT DOCUMENTS

| | | | |
|---|---|---|---|
| 5,263,263 | A | 11/1993 | Gheorghiu et al. |
| 6,225,612 | B1 | 5/2001 | Enegren |
| 2002/0003141 | A1 | 1/2002 | Blaker et al. |
| 2002/0139795 | A1 | 10/2002 | Araya et al. |
| 2011/0227256 | A1 | 9/2011 | Okumura et al. |

FOREIGN PATENT DOCUMENTS

| | | | |
|---|---|---|---|
| JP | S50-160110 | A | 12/1975 |
| JP | S60-037382 | B2 | 8/1985 |
| JP | S63-166745 | A | 7/1988 |
| JP | H03-275310 | A | 12/1991 |
| JP | H05-105501 | A | 4/1993 |
| JP | H06-298563 | A | 10/1994 |
| JP | H0787947 | A * | 4/1995 |
| JP | 2004-503917 | A | 2/2004 |
| JP | 2004-526649 | A | 9/2004 |
| JP | 2006-183886 | | 7/2006 |
| JP | 2008-230962 | A | 10/2008 |
| JP | 2009-250474 | A | 10/2009 |

OTHER PUBLICATIONS

International Search Report and Written Opinion (Application No. PCT/JP2020/006925) dated Apr. 14, 2020 (with English translation).

English translation of International Preliminary Report on Patentability (Chapter I) (Application No. PCT/JP2020/006925) 6 pages, dated Sep. 1, 2022.

* cited by examiner

DIELECTRIC DRYING METHOD AND DIELECTRIC DRYING APPARATUS FOR CERAMIC FORMED BODIES, AND METHOD FOR PRODUCING CERAMIC STRUCTURES

FIELD OF THE INVENTION

The present invention relates to a dielectric drying method and a dielectric drying apparatus for ceramic formed bodies, and a method for producing ceramic structures.

BACKGROUND OF THE INVENTION

Ceramic structures are used for various applications. For example, honeycomb-shaped ceramic structures having a partition wall that defines a plurality of cells each extending from a first end face to a second end face are widely used for catalyst supports, diesel particulate filters (DPFs), gasoline particulate filters (GPFs), and the like.

The ceramic structure is produced by forming a green body containing a ceramic raw material to obtain a ceramic formed body, and then drying and firing the ceramic formed body. As used herein, a state after extrusion molding and before drying is referred to as a ceramic formed body, and a state after firing is referred to as a ceramic structure.

Dielectric drying is generally used as a method for drying the ceramic formed body. According to the dielectric drying, the ceramic formed body can be placed between a pair of electrodes, a current can be conducted through the electrodes to subject a dipole of water in the ceramic formed body to molecular movement, and the ceramic formed body can be dried by the frictional heat.

However, the dielectric drying is difficult to dry uniformly the ceramic formed body, causing problems of generating cracks and the like during firing, or resulting in non-uniform dimensions of the ceramic structure. Therefore, various measures have been taken for the dielectric drying.

For example, Patent Literature 1 proposes a method for drying a honeycomb formed body (ceramic formed body) using a drying table in which a certain region including a portion contacted with an opened lower end face of the honeycomb formed body is a perforated plate, because when the honeycomb formed body is placed on the drying table and dielectrically dried, a high moisture region is generated near upper and lower end faces.

Further, Patent Literature 2 proposes a method for drying a honeycomb formed body (a ceramic formed body) while placing a perforated plate on an opened upper end face of the honeycomb formed body, in order to ensure uniform drying conditions between the upper portion and the lower portion of the honeycomb formed body.

Further, Patent Literature 3 proposes a method for drying honeycomb formed bodies (ceramic formed bodies) by dividing electrodes provided above upper end faces and below lower end faces of the honeycomb formed bodies into a plurality of electrodes at positions corresponding to the upper and lower end faces, respectively, and intermittently moving the honeycomb formed bodies for each pair of electrode units, in order to suppress variations in drying of the honeycomb formed bodies continuously conveyed by a conveyor.

Further, Patent Literature 4 proposes a method for drying a honeycomb formed body while rotating it around its longitudinal axis between a pair of electrodes, in order to dry uniformly the honeycomb formed body.

PRIOR ART

Patent Literatures

[Patent Literature 1] Japanese Patent Application Publication No. S60-37382 B

[Patent Literature 2] Japanese Patent Application Publication No. S63-166745 A

[Patent Literature 3] Japanese Patent Application Publication No. H05-105501 A

[Patent Literature 4] Japanese Patent Application Publication No. H06-298563 A

SUMMARY OF THE INVENTION

The present invention relates to a dielectric drying method for ceramic formed bodies, the method comprising drying a plurality of ceramic formed bodies placed side by side in a direction perpendicular to a conveying direction on upper surfaces of drying tables by conveying the ceramic formed bodies between electrodes of an upper electrode and a lower electrode, and applying a high frequency between the electrodes, wherein, in the direction perpendicular to the conveying direction of the ceramic formed body, a distance between the electrodes in two end regions between which a central region is interposed is shorter than a distance between the electrodes in the central region.

Further, the present invention relates to a method for producing ceramic structures, comprising the dielectric drying method for the ceramic formed bodies.

Furthermore, the present invention relates to a dielectric drying apparatus for ceramic formed bodies, the apparatus comprising:

an upper electrode;

a lower electrode; and a conveying unit capable of conveying a plurality of ceramic formed bodies between electrodes of the upper electrode and the lower electrode, the ceramic formed bodies being placed side by side in a direction perpendicular to a conveying direction on upper surfaces of drying tables, wherein, in the direction perpendicular to the conveying direction of the ceramic formed body, a distance between the electrodes in two end regions between which a central region is interposed is shorter than a distance between the electrodes in the central region.

DETAILED DESCRIPTION OF THE INVENTION

Figure 1:
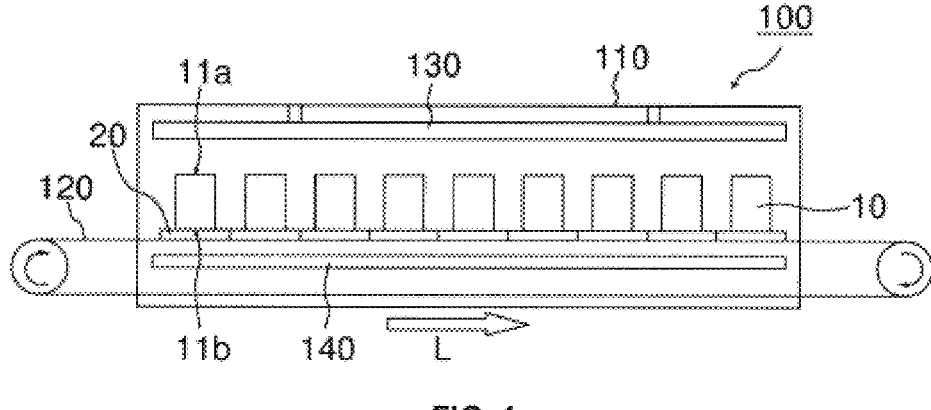
FIG. 1 is a schematic view of a dielectric drying apparatus suitable for use in a dielectric drying method for ceramic formed bodies according to an embodiment of the present invention in a conveying direction.

The dielectric drying of the ceramic formed body is carried out by placing a plurality of (for example, 2 to 5) ceramic formed bodies side by side in a direction perpendicular to a conveying direction on an upper surface of the drying table, and continuously conveying the drying table between the upper electrode and the lower electrode by a conveying unit such as a conveyor.

However, although the methods described in Patent Literatures 1 and 2 can suppress a variation in the dried state of the upper portion and the lower portion of the single ceramic formed body placed on the drying table, it is difficult to suppress a variation in the dried state in the direction perpendicular to the conveying direction (a width direction of the drying table). Specifically, since the ceramic formed body placed near the central portion in the width direction of the drying table is located in an environment where field intensity is higher, it has a higher drying rate, so that a drying shrinkage rate tends to increase. On the other hand, since the ceramic formed body placed near the end in the width direction of the drying table is located in an environment where the field intensity is lower, it has a lower drying rate, so that the drying shrinkage rate tends to decrease. As a result, the dried state varies depending on different positions of the ceramic formed bodies arranged on the drying table.

Further, the method described in Patent Literature 3 is intended to suppress variations in the dried states of the ceramic formed bodies placed on a plurality of drying tables in the conveying direction. However, it is not intended to suppress variations in the dried states of the plurality of ceramic formed bodies in the direction perpendicular to the conveying direction.

Furthermore, since the method described in Patent Literature 4 is used in a batch furnace, it is difficult to apply this method to a continuous furnace premised on mass production.

The present invention has been made to solve the above problems. An object of the present invention is to provide a dielectric drying method and a dielectric drying apparatus for ceramic formed bodies, which can suppress variations in dried states of a plurality of ceramic formed bodies placed on drying tables, in a direction perpendicular to a conveying direction.

Another object of the present invention is to provide a method for producing ceramic structures, which can provide ceramic structures each having a uniform shape.

As a result of intensive studies for the dielectric drying of the ceramic formed bodies, the present inventors have found that the above problems can be solved by controlling a distance between electrodes depending on positions where the ceramic formed bodies are arranged on the drying tables, and have completed the present invention.

According to the present invention, it is possible to provide a dielectric drying method and a dielectric drying apparatus for ceramic formed bodies, which can suppress variations in dried states of a plurality of ceramic formed bodies placed on drying tables, in a direction perpendicular to a conveying direction.

Further, according to the present invention, it is possible to provide a method for producing ceramic structures, which can provide ceramic structures having a uniform shape.

Hereinafter, embodiments according to the present invention will be specifically described. It is to understand that the present invention is not limited to the following embodiments, and various modifications and improvements, which will be within the scope of the present invention, may be made based on ordinary knowledge of a person skilled in the art, without departing from the spirit of the present invention.

(1) Dielectric Drying Method and Dielectric Drying Apparatus for Ceramic Formed Bodies A dielectric drying method for ceramic formed bodies according to an embodiment of the present invention is carried out by drying a plurality of ceramic formed bodies placed side by side in a direction perpendicular to a conveying direction on upper surfaces of drying tables by conveying the ceramic formed bodies between an upper electrode and a lower electrode (between electrodes), and applying a high frequency between the electrodes.

FIG. 1 shows a schematic view of a dielectric drying apparatus in the conveying direction, which is suitable for use in the dielectric drying method for the ceramic formed bodies. Further, FIG. 2 shows a schematic view of the dielectric drying apparatus in the direction perpendicular to the conveying direction.

As shown in FIG. 1, a dielectric drying apparatus 100 includes: an upper electrode 130; a lower electrode 140; and a conveying unit 120 (for example, a conveyor) capable of conveying a plurality of ceramic formed bodies 10 between the upper electrode 130 and the lower electrode 140, the ceramic formed bodies 10 being placed side by side in the direction perpendicular to the conveying direction on upper surfaces of drying tables 20. The upper electrode 130 is provided at an upper part of a dielectric drying furnace 110, and the lower electrode 140 is provided at a lower part of the dielectric drying furnace 110. The dielectric drying apparatus 100 having such a basic structure is known in the art. The dielectric drying apparatus 100 may further have a known structure (for example, a ventilation drying apparatus) as long as the effect of the present invention is not impaired.

The plurality of ceramic formed bodies 10 placed on the drying tables 20 are conveyed between the upper electrode 130 and the lower electrode 140 in the dielectric drying furnace 110 by the conveying unit 120. In this case, the dipole of water in the ceramic formed bodies 10 is subjected to molecular movement by the high frequency energy generated by passing an electric current between the upper electrode 130 and the lower electrode 140, and the ceramic formed bodies 10 can be dried by that frictional heat.

Figure 2:
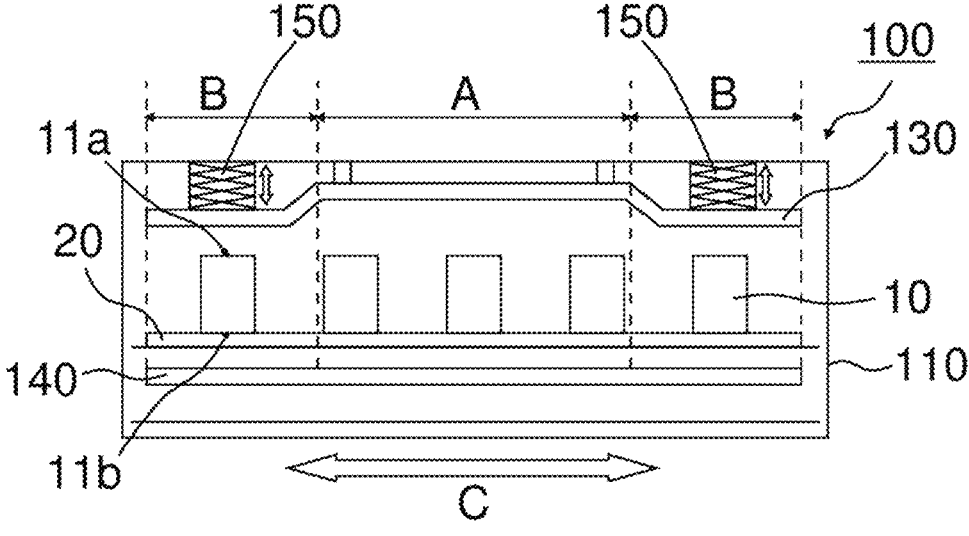
FIG. 2 is a schematic view of the dielectric drying apparatus of FIG. 1 in a direction perpendicular to a conveying direction.

As shown in FIG. 2, the plurality of ceramic formed bodies 10 are placed side by side on the upper surfaces of the drying tables 20 in a direction perpendicular to a conveying direction L (which is, hereinafter, referred to as a "width direction C").

The number of the ceramic formed bodies 10 placed on the drying table 20 may be appropriately adjusted depending on the size of the drying table 20, and the like. It is preferably from 2 to 5, and more preferably 3 to 5.

In the direction perpendicular to the conveying direction of the ceramic formed body 10, a distance D1 between the electrodes in each of two end regions B between which a central region A is interposed is shorter than a distance D2 between the electrodes in the central region A. FIG. 2 illustrates an example in which, of the five ceramic formed bodies 10 placed side by side in the width direction C of the drying table 20, two ceramic formed bodies 10 at both ends are located in the end regions B, and the three ceramic formed bodies 10 are located in the central region A.

Figure 3:
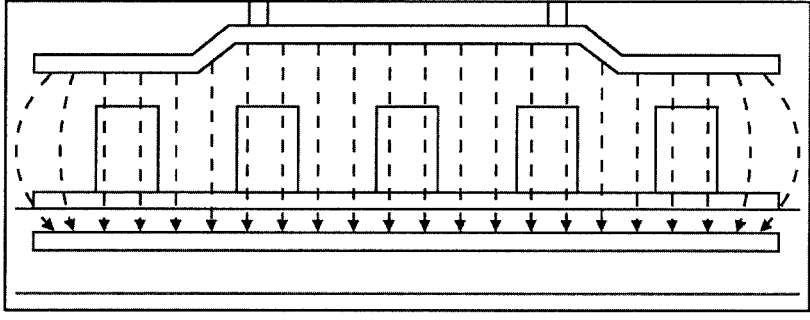
FIG. 3 is a view showing density distributions of lines of electric force in the schematic view of the dielectric drying apparatus of FIG. 2.

By controlling the distance between the electrodes as described above, as shown in FIG. 3, the density distribution of the lines of electric force in the end regions B becomes substantially the same as that of the lines of electric force in the central region A, resulting in a decreased variation in field intensity between the upper electrode 130 and the lower electrode 140 in the width direction C. Therefore, the drying rate of the ceramic formed bodies 10 located in the end regions B is substantially the same as that of the ceramic formed bodies 10 located in the central region A, so that it is possible to suppress a variation in dried state of the plurality of ceramic formed bodies 10 placed on the drying tables 20 in the width direction C.

Figure 4:
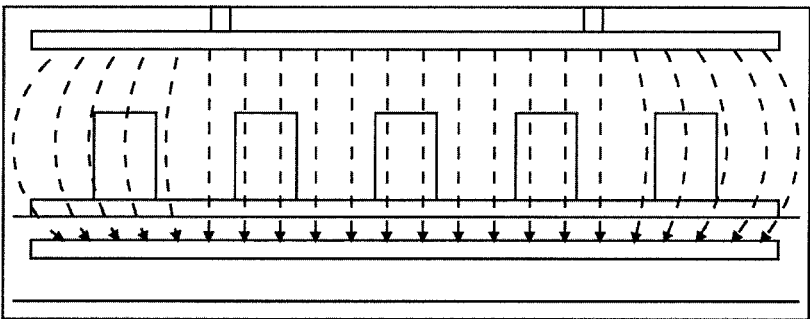
FIG. 4 is a view showing a density distribution of lines of electric force when distances between electrodes in a central region and end regions are identical.

When the distance D1 between the electrodes in each of the two end regions B is the same as the distance D2 between the electrodes in the central region A, the density of the lines of electric force in the end regions B becomes lower than that in the central region, as shown in FIG. 4. Therefore, the field intensity in the end regions B becomes lower than that in the central region A, and the ceramic formed bodies 10 located in the end regions B becomes difficult to dry as compared with the ceramic formed bodies 10 located in the central region A.

The method for controlling the distance between the electrodes as described above is not particularly limited, but for example, the structure of the upper electrode 130 may be adjusted. More particularly, the upper electrode 130 in each of the end regions B may be deformed into a convex shape so as to be closer to the ceramic formed bodies 10 than the upper electrode 130 in the central region A. In a typical embodiment, the upper electrode 130 has flat surface portions 131, 132 parallel to an upper end face 11*a* of the ceramic formed body 10 in the central region A and the two end regions B, and has an inclined portion 133 between the flat surface portion 131 of the central region A and the flat surface portions 132 in each of the two end regions B. Such a structure allows the above effects to be easily obtained.

It should be noted that the distance between the electrodes may be controlled by making the thickness of the upper electrode 130 in each of the end regions B higher than that of the upper electrode 130 in the central region A.

A suitable range of the distance between the electrodes in each of the end regions B (the distance between the upper electrode 130 and the upper end face 11*a* of the ceramic formed body 10) varies depending on conditions such as sizes of the ceramic formed bodies 10 and the number of the ceramic formed bodies 10 placed side by side in the width direction C of the drying table 20. Therefore, in order to allow the distance between the electrodes in each of the end regions B to be adjustable by those conditions, it is preferable to further provide a mechanism 150 for controlling the distance between the upper electrode 130 and the upper end face 11*a* of the ceramic formed body 10 in each of the two end regions B.

Such a mechanism is not particularly limited, but for example, a jig that can be expanded and contracted in the vertical direction may be arranged on the surface of the upper electrode 130 opposite to the ceramic formed body 10 in each of the end regions B, and the distance between the upper electrode 130 and the upper end surface 11*a* of the ceramic formed body 10 may be adjusted by expanding and contracting the jig in the vertical direction.

Each distance D3 between the upper end face 11*a* of the ceramic formed body 10 located in each of the end regions B and the upper electrode 130 is preferably 50 to 95%, more preferably 60 to 90%, of a distance D4 between the upper end face 11*a* of the ceramic formed body 10 located in the central region A and the upper electrode 130. By controlling the distance D3 to such a range, the above effects can be stably obtained.

Here, the central region A and the two end regions B may be appropriately determined depending on the variation in field intensity between the upper electrode 130 and the lower electrode 140 in the width direction C of the dielectric drying apparatus 100 to be used, although not limited thereto. In a typical embodiment, each of the two end regions B may be a region at a position having a length in the width direction of 5 to 40%, preferably 10 to 30%, from the end of the electrode with respect to the total length of the pair of electrodes (upper electrode 130 and lower electrode 140) in the width direction C. Further, the central region A may be a position having a length in the width direction of 5 to 40%, preferably 10 to 30% with respect to the total length in the width direction C of the pair of electrodes (provided that the central portion of the electrode in the width direction C is the center).

In the direction perpendicular to the conveying direction L of the ceramic formed body 10 (the width direction C), the length of the upper electrode 130 in each of the two end regions B may preferably be 5 to 40%, more preferably 10 to 30%, of the total length of the upper electrode 130. Further, in the direction perpendicular to the conveying direction L of the ceramic formed body 10 (the width direction C), the length of the upper electrode 130 in the central region A may preferably be 20 to 90%, more preferably 40 to 80%, of the total length of the upper electrode 130. By controlling the lengths of the upper electrodes 130 in the two end regions B and the central region A to the above ranges, the above effects can be stably obtained.

The drying table 20 preferably has perforated plates at portions that are brought into contact with lower end faces 11*b* of the plurality of ceramic formed bodies 10. Such a structure can allow water vapor to be easily removed from the lower end faces 11*b* of the ceramic formed bodies 10 during dielectric drying, so that the ceramic formed bodies 10 can be easily and uniformly dried.

As used herein, the "perforated plate" means a plate material having openings.

Non-limiting examples of a material of the perforated plate include aluminum, copper, aluminum alloys, copper alloys, and graphite. These can be used alone or in combination of two or more.

A perforation ratio of the perforated plate is preferably from 20 to 90%, and more preferably from 40 to 80%, although not particularly limited thereto. The controlling of the perforation ratio to such a range can lead to stable removal of water vapor from the lower end faces 11*b* of the ceramic formed bodies 10 during dielectric drying.

As used herein, the "perforation ratio of the perforated plate" means a ratio of perforated areas to the total area of the surface of the perforated plate that is brought into contact with the upper end face 11*a* of the ceramic formed body 10.

The openings on the surface of the perforated plate that is brought into contact with the upper end face 11*a* of the ceramic formed body 10 may have various shapes, including, but not limited to, a circular shape, a quadrangular shape, and a slit shape.

An auxiliary electrode may be placed on each of upper end faces 11*a* of the plurality of ceramic formed bodies 10. The placing of the auxiliary electrodes 30 can lead to stable removal of water vapor from the lower end faces 11*b* of the ceramic formed bodies 10 during dielectric drying.

For each auxiliary electrode, the thickness of the portion that is brought into contact with the upper end face 11*a* of each of the ceramic formed bodies 10 located in the end regions B in the width direction C is preferably higher than the thickness of the portion that is brought into contact with the upper end faces 11*a* of the ceramic formed bodies 10 located in the central region A. The placing of the auxiliary electrodes having different thicknesses results in easy control of the density distribution of the lines of electric force in the end regions B to substantially the same level with that in the central region A, so that the variation in the field intensity between the upper electrode 130 and the lower electrode 140 in the width direction C can be reduced. Therefore, it is possible to stably suppress the variation in the dried state in the width direction C of the plurality of ceramic formed bodies 10 placed on the drying tables 20.

The thickness of the auxiliary electrode placed on each of the upper end faces 11*a* of the ceramic formed bodies 10 located in the central region A may preferably be 4 to 50%, more preferably 20 to 40%, of the thickness of the auxiliary electrode placed on each of the upper end faces 11*a* of the ceramic formed bodies 10 located in the two end regions B. By controlling the thickness of each auxiliary electrode to such a range, the above effects can be stably obtained.

A material of each auxiliary electrode is not particularly limited. It is preferable that the material has a conductivity higher than that of the ceramic formed body 10. If it has such a conductivity, a function as the auxiliary electrode can be sufficiently ensured.

The perforated plates used for the auxiliary electrodes 30 are not particularly limited. Th same perforated plates as those used for the drying table 20 may be employed.

The auxiliary electrodes may be placed on the upper end faces 11*a* of the plurality of ceramic formed bodies 10 using a gripping apparatus for gripping each auxiliary electrode. In this case, if the auxiliary electrodes have different thicknesses, the existing gripping apparatus may be difficult to be used. Therefore, it is desirable that the thicknesses of the auxiliary electrodes placed on the upper end faces 11*a* of the plurality of ceramic formed bodies 10 are substantially the same.

Figure 5:
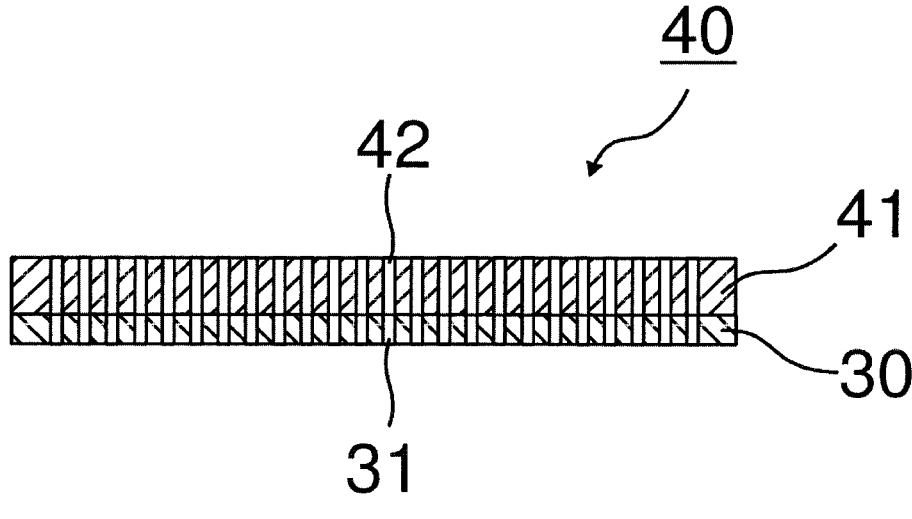
FIG. 5 is a cross-sectional view of an auxiliary electrode member according to an embodiment of the present invention.
Figure 6:
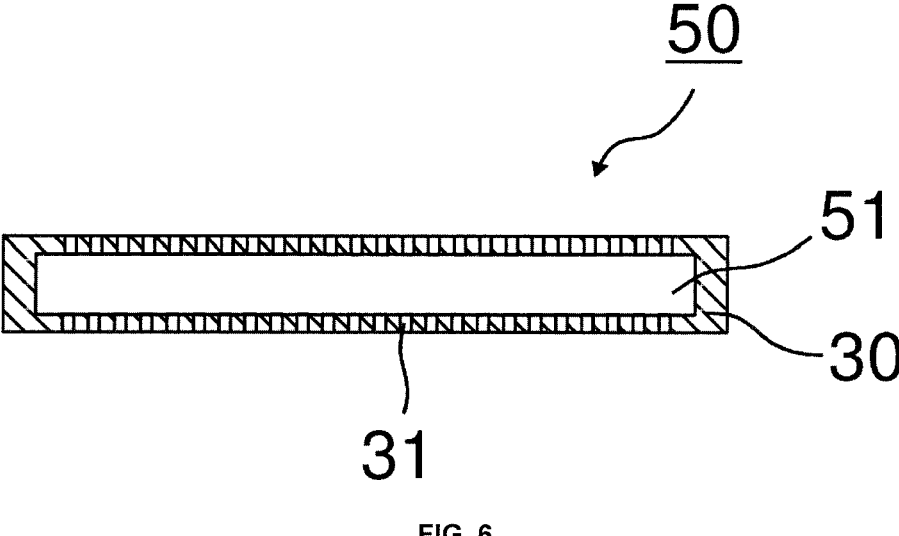
FIG. 6 is a cross-sectional view of another auxiliary electrode member according to an embodiment of the present invention.

Therefore, it is preferable that auxiliary electrode members 40, 50 as shown in FIGS. 5 and 6 are used in place of the auxiliary electrodes placed on the upper end faces 11*a* of the ceramic formed bodies 10 located in the central region A, so that the thicknesses of the auxiliary electrode members 40, 50 are substantially the same as those of the auxiliary electrodes placed on the upper end faces 11*a* of the ceramic formed bodies 10 located in the two end regions B.

The auxiliary electrode member 40 as shown in FIG. 5 includes a laminate of an auxiliary electrode 30 and a low dielectric loss material 41. The use of the auxiliary electrode member 40 having such a structure can lead to a decreased thickness of the auxiliary electrode 30 at the portion that is brought into contact with the upper end faces 11*a* of the ceramic formed bodies 10 located in the central region A.

As used herein, the "low dielectric loss material 41" means a material having a lower dielectric loss. The low dielectric loss material 41 preferably has a lower relative dielectric constant and a lower dielectric tangent (tan δ). A typical low dielectric loss material 41 has a relative dielectric constant of from 1 to 3 and a dielectric tangent of from 0 to 0.2.

The low dielectric loss material 41 is not particularly limited, and known materials may be used. Examples of the low dielectric loss material 41 include resins such as fluororesin and polypropylene, and the fluororesin is preferable. The fluororesin preferably has a relative dielectric constant of from 2.0 to 3.0 and a dielectric tangent of from 0 to 0.02.

Further, the auxiliary electrode members 40 having substantially the same thickness may be placed on the upper end faces 11*a* of the ceramic formed bodies 10 located in the central region A and the two end regions B. In this case, the thickness of each of the auxiliary electrodes 30 of the auxiliary electrode members 40 in contact with the upper end faces 11*a* of the ceramic formed bodies 10 located in the end regions B may be higher than that of each of the auxiliary electrodes 30 of the electrode members 40 in contact with the upper end faces 11*a* of the ceramic formed bodies 10 located in the central region A.

It is preferable that the auxiliary electrode 30 and the low dielectric loss material 41 have openings 31, 42, respectively. Further, it is preferable that the positions of the openings 42 of the low dielectric loss material 41 coincides with the positions of the openings 31 of the auxiliary electrode 30. With such a structure, water vapor can be easily removed from the upper end faces 11*a* of the ceramic formed bodies 10 during dielectric drying, enabling easy and uniform drying of the ceramic formed bodies 10.

The auxiliary electrode member 50 as shown in FIG. 6 has a hollow region 51 inside the auxiliary electrode 30. Such a structure can lead to a decreased thickness of the auxiliary electrode 30 at the portion that is brought into contact with the upper end faces 11*a* of the ceramic formed bodies 10 located in the central region A. Further, by providing the hollow region, the weight is reduced, so that the handleability is improved and the deformation of the ceramic formed body 10 due to the weight of the auxiliary electrode 30 can be suppressed.

As used herein, the "hollow region 51" of the auxiliary electrode 30 means a space region extending in a direction perpendicular to the thickness direction of the auxiliary electrode 30.

Further, the auxiliary electrode members 50 having substantially the same thickness may be placed on the upper end faces 11*a* of the ceramic formed bodies 10 located in the central region A and the two end regions B. In this case, the thickness of each of the auxiliary electrodes 30 of the auxiliary electrode members 50 in contact with the upper end faces 11*a* of the ceramic formed bodies 10 located in the end regions B may be higher than that of each of the auxiliary electrodes 30 of the electrode members 50 in contact with the upper end faces 11*a* of the ceramic formed bodies 10 located in the central region A.

The auxiliary electrode member 50 having the hollow region 51 inside preferably has openings 31. Such a configuration can lead to easy removal of water vapor from the upper end faces 11*a* of the ceramic formed bodies 10 during dielectric drying, resulting in easy and uniform drying of the ceramic formed bodies 10.

Various conditions (frequency, output, heating time, and the like) during dielectric drying may be appropriately set depending on objects to be dried (ceramic formed bodies 10), types of the dielectric drying apparatus 100, and the like. For example, the frequency during dielectric drying is preferably from 10 MHz to 100 MHz.

The ceramic formed bodies 10 to be subjected to the dielectric drying method preferably have a moisture content of from 1 to 60%, and more preferably from 5 to 55%, and even more preferably from 10 to 50%, although not limited thereto. The ceramic formed bodies 10 in such a range tend to vary in the dried state during dielectric drying. Therefore, the effect of the present invention can be more easily obtained by using the ceramic formed bodies 10 having the moisture content in such a range.

As used herein, the moisture content of the ceramic formed bodies 10 means a moisture content measured by an infrared heating type moisture meter.

The ceramic formed body 10 may preferably be a honeycomb formed body including a partition wall that defines a plurality of cells each extending from a first end face to a second end face, although not particularly limited thereto.

A cell shape of the honeycomb formed body (a cell shape in a cross section orthogonal to a cell extending direction) is not particularly limited. Examples of the cell shape include a triangle, a quadrangle, a hexagon, an octagon, a circle or a combination thereof.

Examples of a shape of the honeycomb formed body include, but not limited to, a cylindrical shape, an elliptical pillar shape, and a polygonal pillar shape having a square, rectangular, triangular, pentagonal, hexagonal, and octagonal end faces.

The ceramic formed body 10 can be obtained by forming a green body obtained by kneading a raw material composition containing a ceramic raw material and water.

The ceramic raw material that can be used herein includes, but not particularly limited to, cordierite-forming raw materials, cordierite, silicon carbide, silicon-silicon carbide composite materials, mullite, aluminum titanate, and the like. These can be used alone or in combination of two or more. The cordierite-forming raw material is a ceramic raw material formulated so as to have a chemical composition in which silica is in the range of from 42 to 56% by mass, alumina is in the range of from 30 to 45% by mass, and magnesia is in the range of from 12 to 16% by mass. The cordierite-forming raw material is calcined to form cordierite.

The raw material composition may contain a dispersion medium, a binding material (for example, an organic binder, an inorganic binder, or the like), a pore former, a surfactant, and the like, in addition to the ceramic raw material and water. A composition ratio of each raw material preferably depends on the structures, materials, and the like of the ceramic formed bodies 10 to be produced, although not particularly limited thereto.

A method of kneading the raw material composition to form the green body can use, for example, a kneader, a vacuum green body kneader, or the like. Further, a method of forming the ceramic formed body 10 can employ, for example, a known molding method such as extrusion molding and injection molding. Specifically, when the honeycomb formed body is produced as the ceramic formed body 10, the extrusion molding may be performed using a die having a desired cell shape, partition wall (cell wall) thickness, and cell density. Examples of a material of the die that can be used herein include hard metal alloys that are resistant to wear.

In the dielectric drying method for the ceramic formed bodies according to the embodiment of the present invention, the distance between electrodes in the central region A and each of the two end regions B is controlled, whereby density distributions (i.e., the field intensities) of the lines of electric force in the central region A and the two end regions B are of the same degree. Therefore, it is possible to suppress variations in the dried states of the plurality of ceramic formed bodies 10 placed on the drying tables in the direction (i.e., the width direction C) perpendicular to the conveying direction L.

(2) Method for Producing Ceramic Structures

The method for producing ceramic structures according to an embodiment of the present invention includes the above dielectric drying method for the ceramic formed bodies 10.

In the method for producing the ceramic structures according to the embodiment of the present invention, steps other than the above dielectric drying method are not particularly limited, and steps known in the art can be applied. Specifically, the method for producing the ceramic structures according to the embodiment of the present invention can further include a firing step of drying the ceramic formed bodies 10 using the above dielectric drying method to obtain ceramic dried bodies, and then firing the ceramic dried bodies to obtain ceramic structures.

A method for firing the ceramic dried bodies is not particularly limited, and for example, the ceramic dried bodies may be fired in a firing furnace. Further, for the firing furnace and firing conditions, known conditions can be appropriately selected depending on the outer shapes, materials, and the like of the honeycomb structures to be produced. Prior to firing, organic substances such as a binder may be removed by calcination.

Since the method for producing the ceramic structures according to the embodiment of the present invention includes the dielectric drying method capable of suppressing variations in the dried states of the plurality of ceramic formed bodies 10 placed on the drying tables 20 in the direction (i.e., the width direction C) perpendicular to the conveying direction L of the ceramic formed bodies 10, the ceramic structures having a uniform shape can be produced.

EXAMPLES

Hereinafter, the present invention will be described in more detail with reference to Examples, but the present invention is not limited to these Examples.
(Production of Ceramic Formed Bodies)

A cordierite-forming raw material obtained by mixing alumina, kaolin and talc as a ceramic raw material was mixed with a binding material containing an organic binder, a water-absorbent resin as a pore former, and water (42% by mass) as a dispersion medium to form a raw material composition, which was then kneaded to provide green bodies. Each of the resulting green bodies was extruded to obtain a honeycomb formed body including cells each having a square cross-sectional shape orthogonal to the extending direction of the cells. The honeycomb formed body had an outer diameter (diameter) of 144 mm, a length (length in the extending direction of the cells) of 260 mm, and a cylindrical outer shape. Further, the honeycomb formed bodies had a moisture content of 42% and a weight of 1320 g. The moisture content and weight of the honeycomb formed bodies are average values of all the produced honeycomb formed bodies.

Example

Five ceramic formed bodies were placed side by side in the direction (the width direction C) perpendicular to the conveying direction L on the upper surfaces of the drying tables. Thus, nine drying tables in total, each on which the five ceramic formed bodies were placed, were prepared. When the drying tables on which the ceramic formed bodies have been placed are conveyed to the dielectric drying apparatus, two ceramic formed bodies on the both ends, of the five ceramic formed bodies placed in the width direction C of the drying table, are located in the end regions B, and the three central ceramic formed bodies are located in the central region A. The auxiliary electrodes (perforated plates) having the same thickness were placed on the upper end faces of the five ceramic formed bodies.

The upper electrode of the dielectric drying apparatus had a shape as shown in FIG. 2. The total length of the upper electrode 130 in the width direction C was 1150 mm, the length of the flat surface portion 131 in the central region A was 600 mm, and the length of each of the flat surface portion 132 in the two end regions B was 200 mm, and the length of each of the inclined portions in the two end regions B was 75 mm. The length of the upper electrode 130 in the central region A is about 52% of the total length of the upper electrode 130, and the length of the upper electrode 130 in each of the two end regions B is about 24% of the total length of the upper electrode 130. Further, the two flat surface portions 132 in the end regions B were set to be closer to the ceramic formed body side by 30 mm than the flat surface portion 131 in the central region A. The distance D3 between each of the two flat surface portions 132 in the end regions B and the upper electrode 130 was 70 mm, and the distance D4 between the flat surface portion 131 in the central region A and the upper electrode 130 was 100 mm. In addition, the distance D3 is 70% of the distance D4.

The dielectric drying was carried out by placing nine drying tables on which five honeycomb formed bodies were placed, on the conveying unit (conveyor) for the dielectric drying apparatus, and then conveying the drying tables into the dielectric drying furnace, and drying them under conditions of a frequency of 40.0 MHz, an output of 85.0 kW, and a heating time of 12 minutes.

Comparative Example

Dielectric drying of the ceramic formed bodies was carried out under the same conditions as those of Example, with the exception that the dielectric drying was carried out using a dielectric drying apparatus having a planar electrode (total length of 1150 mm in the width direction C) as the upper electrode.

The weights of the ceramic formed bodies subjected to the dielectric drying in the above Example and Comparative Example were measured, and their residual moisture contents were calculated by the following equation:

$$\text{Residual moisture content} (\%) = M - (W1 - W2 / W1 \times 100,$$

in which M is the moisture content of the honeycomb formed body before dielectric drying (42%), W1 is the weight of the honeycomb formed body before dielectric drying (1320 g), and W2 is the weight of the honeycomb formed body after dielectric drying (g).

The residual moisture content was calculated for each position (row) of the drying tables in the width direction C. The results of the residual moisture content are represented as Rows 1 to 5 from the left side in the width direction C of the drying table, when regarding the conveying direction L as the front. The residual moisture content was an average value for each row. The results are shown in Table 1. In Table 1, a difference A (variation) between the maximum value and the minimum value of the residual moisture content in each row is also shown.

TABLE 1

| | Residual Moisture Content (%) | | | | | |
|---|---|---|---|---|---|---|
| | Row 1 | Row 2 | Row 3 | Row 4 | Row 5 | DiffferenceΔ |
| Example | 5.7 | 7.3 | 6.6 | 7.9 | 6.6 | 2.2 |
| Comparative Example | 10.4 | 6.3 | 6.2 | 6.4 | 9.6 | 4.2 |

As shown in Table 1, in the Example, the residual moisture contents of the ceramic formed bodies in rows 2 to 4, which were located in the central region A, were on the same level with the residual moisture contents of the ceramic formed bodies in rows 1 and 5, which were located in the end regions B, and a difference between the maximum and minimum residual moisture contents in the rows was lower.

On the other hand, in the Comparative Example, the residual moisture contents of the ceramic formed bodies in rows 1 and 5, which were located in the end regions B, were higher than those of the ceramic formed bodies in rows 2 to 4, which were located in the central region A.

Further, an outer diameter (diameter) of each ceramic formed body subjected to the dielectric drying in the above Example and Comparative Example was measured, and a drying shrinkage rate was calculated by the following equation:

$$\text{Drying shrinkage rate} (\%) = (R1 - R2)/R1 \times 100,$$

in which R1 represents an outer diameter (144 mm) of the honeycomb formed body before dielectric drying, and R2 represents an outer diameter (mm) of the honeycomb formed body after dielectric drying.

The drying shrinkage rate was calculated for each position (row) in the width direction C of the drying table, as in the residual moisture rate. The drying shrinkage rate was an average value in each row. The results are shown in Table 2. In Table 2, a difference Δ (variation) between the maximum value and the minimum value of the drying shrinkage rate in each column is also shown.

TABLE 2

| | Drying Shrinkage Rate (%) | | | | | |
|---|---|---|---|---|---|---|
| | Row 1 | Row 2 | Row 3 | Row 4 | Row 5 | DiffferenceΔ |
| Example | 4.7 | 4.8 | 4.8 | 4.7 | 4.6 | 0.2 |
| Comparative Example | 4.3 | 4.8 | 4.9 | 4.8 | 4.4 | 0.6 |

As shown in Table 2, in the Example, the dry shrinkage rates of the ceramic formed bodies in rows 2 to 4, which were located in the central region A, were on the same level with the dry shrinkage rates of the ceramic formed bodies in rows 1 and 5, which were located in the end regions B. A difference between the maximum value and the minimum value of the drying shrinkage rate in each row was lower.

On the other hand, in the Comparative Example, the drying shrinkage rates of the ceramic formed bodies in rows 2 to 4, which were located in the central region A, were higher than those of the ceramic formed bodies in rows 1 and 5, which were located in the end regions B. The difference $\Delta$ between the maximum value and the minimum value of the drying shrinkage rate in each raw was higher.

As can be seen from the above results, according to the present invention, it is possible to provide a dielectric drying method and a dielectric drying apparatus for ceramic formed bodies, which can suppress variations in the dried states of a plurality of ceramic formed bodies placed on the drying tables, in the direction perpendicular to the conveying direction. Further, according to the present invention, it is possible to provide a method for producing ceramic structures, which can provide the ceramic structures having a uniform shape.

DESCRIPTION OF REFERENCE NUMERALS 10 ceramic formed body
11a upper surface
11b lower surface
20 drying table
30 auxiliary electrode
31 opening
40 auxiliary electrode member
41 low dielectric loss material
42 opening
50 auxiliary electrode member
51 hollow region
100 dielectric drying apparatus
110 dielectric drying furnace
120 conveying unit
130 upper electrode
140 lower electrode
150 mechanism

The invention claimed is:

1. A dielectric drying method for ceramic formed bodies, the method comprising drying a plurality of ceramic formed bodies placed side by side in a direction perpendicular to a conveying direction on upper surfaces of drying tables by conveying the ceramic formed bodies between electrodes of an upper electrode and a lower electrode, and applying a high frequency between the electrodes, wherein, in the direction perpendicular to the conveying direction of the ceramic formed body, a distance between the electrodes in two end regions between which a central region is interposed is shorter than a distance between the electrodes in the central region.

2. The dielectric drying method for ceramic formed bodies according to claim 1, wherein a distance between each of upper end faces of the ceramic formed bodies located in the two end regions and the upper electrode is 50 to 95% of a distance between each of the upper end faces of the ceramic formed bodies located in the central region and the upper electrode.

3. The method dielectric drying for ceramic formed bodies according to claim 1, wherein the upper electrode has flat surface portions each parallel to the upper end face of the ceramic formed body in the central region and the two end regions, and the upper electrode has an inclined portion between the flat surface portion in the central region and the flat surface portion in each of the two end regions.

4. The dielectric drying method for ceramic formed bodies according to claim 1, wherein, in the direction perpendicular to the conveying direction of the ceramic formed body, a length of the upper electrode in each of the two end regions is 5 to 40% of the total length of the upper electrode.

5. The dielectric drying method for ceramic formed bodies according to claim 1, wherein, in the direction perpendicular to the conveying direction of the ceramic formed body, a length of the upper electrode in the central region is 20 to 90% of the total length of the upper electrode.

6. The dielectric drying method for ceramic formed bodies according to claim 1, wherein each of the drying tables has a perforated plate at a portion that is brought into contact with a lower end face of the ceramic formed body.

7. The dielectric drying method for ceramic formed bodies according to claim 1, wherein each of the ceramic formed bodies has a moisture content of from 1 to 60%.

8. The dielectric drying method for ceramic formed bodies according to claim 1, wherein the ceramic formed bodies are honeycomb formed bodies, each of the honeycomb formed bodies comprising a partition wall that defines a plurality of cells each extending from a first end face to a second end face.

9. The dielectric drying method for ceramic formed bodies according to claim 1, wherein an auxiliary electrode is placed on each of the upper end face of the ceramic formed bodies.

10. The dielectric drying method for ceramic formed bodies according to claim 9, wherein a thickness of the auxiliary electrode at a portion that is brought into contact with each of the upper end faces of the ceramic formed bodies located in the two end regions is higher than that of the auxiliary electrode at a portion that is brought into contact with each of the upper end faces of the ceramic formed bodies located in the central region.

11. The dielectric drying method for ceramic formed bodies according to claim 9, wherein the auxiliary electrode is a perforated plate.

12. The dielectric drying method for ceramic formed bodies according to claim 9, wherein an auxiliary electrode member comprising a laminate of the auxiliary electrode and a low dielectric loss material is placed on each of the upper end faces of the ceramic formed bodies located in the central region, and wherein the auxiliary electrode member has substantially the same thickness as that of the auxiliary electrode placed on each of the upper end faces of the ceramic formed bodies located in the two end regions.

13. The dielectric drying method for ceramic formed bodies according to claim 9, wherein auxiliary electrode members comprising a laminate of the auxiliary electrode and a low dielectric loss material and having substantially the same thickness are placed on the upper end faces of the ceramic formed bodies located in the central region and in the two end regions.

14. The dielectric drying method for ceramic formed bodies according to claim 12, wherein the low dielectric loss material is fluororesin.

15. The dielectric drying method for ceramic formed bodies according to claim 9, wherein an auxiliary electrode member having a hollow region inside the auxiliary electrode is placed on each of the upper end faces of the ceramic formed bodies located in the central region, and wherein the auxiliary electrode member has substantially the same thickness as that of the auxiliary electrode placed on each of the upper end faces of the ceramic formed bodies located in the two end regions.

16. The dielectric drying method for ceramic formed bodies according to claim 9, wherein auxiliary electrode members each comprising a hollow region inside the auxiliary electrode and having substantially the same thickness are placed on the upper end faces of the ceramic formed bodies located in the central region and in the two end regions.

17. A method for producing ceramic structures, comprising the dielectric drying method for the ceramic formed bodies according to claim 1.

\*   \*   \*   \*   \*